United States Patent Office 2,834,468
Patented May 13, 1958

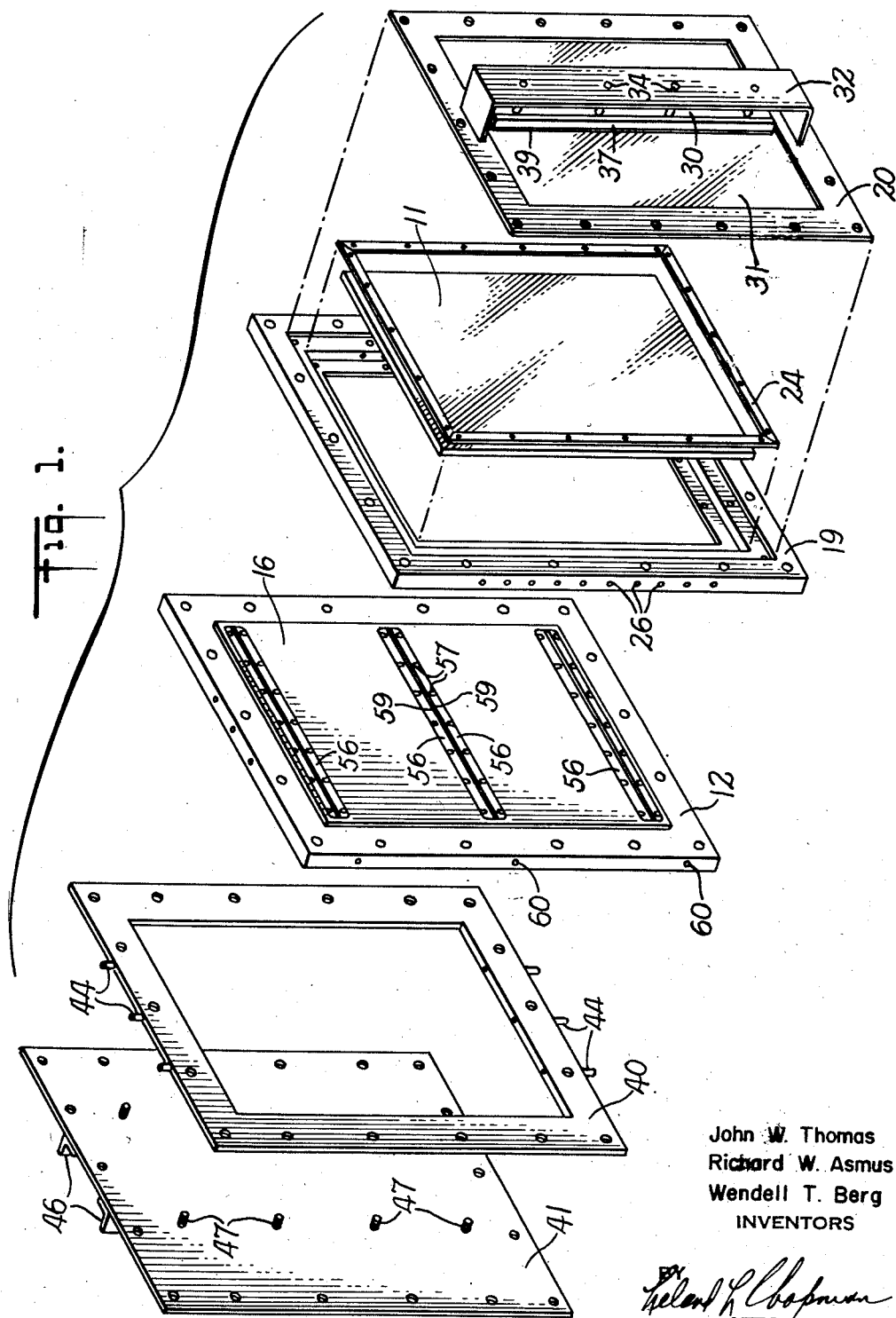

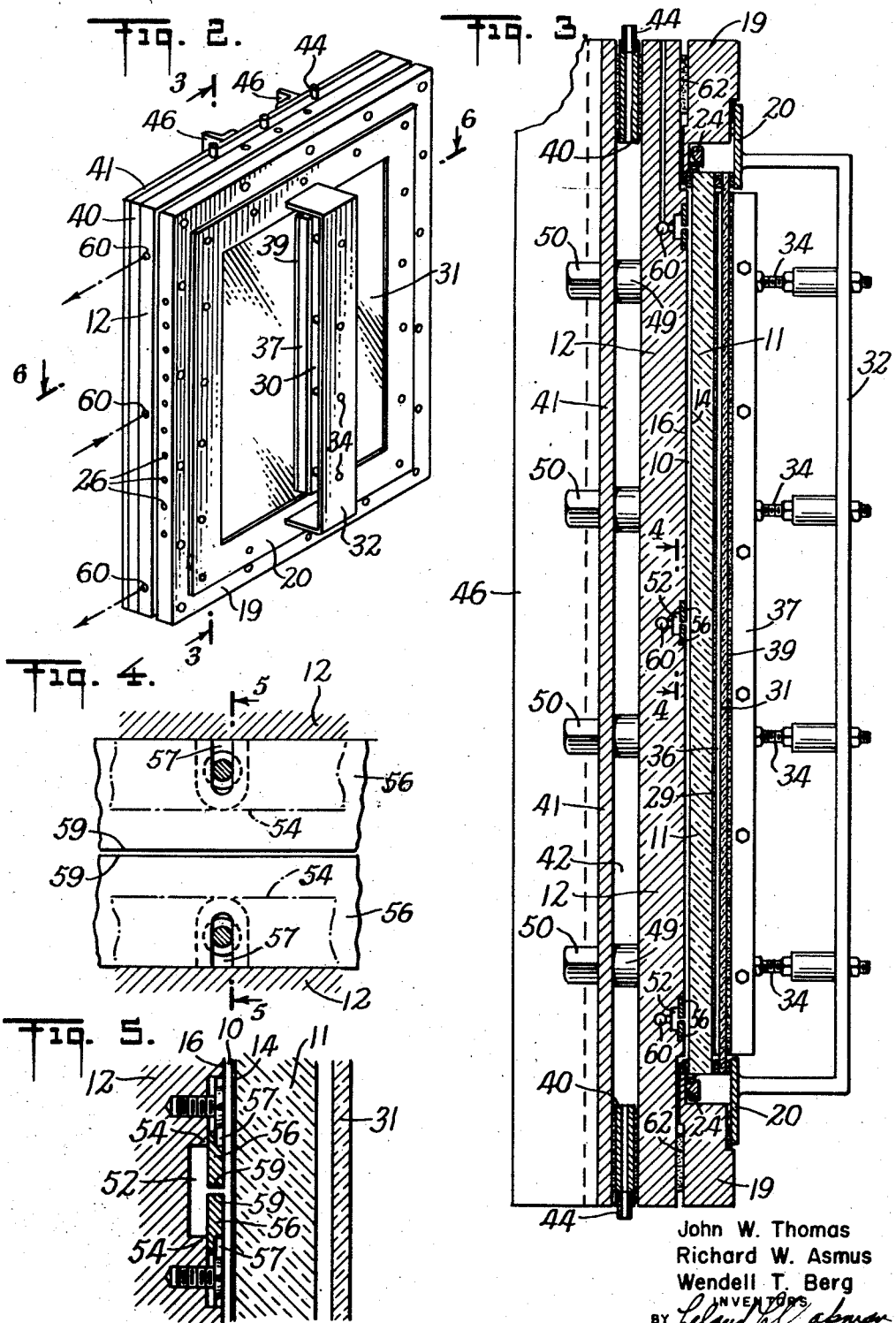

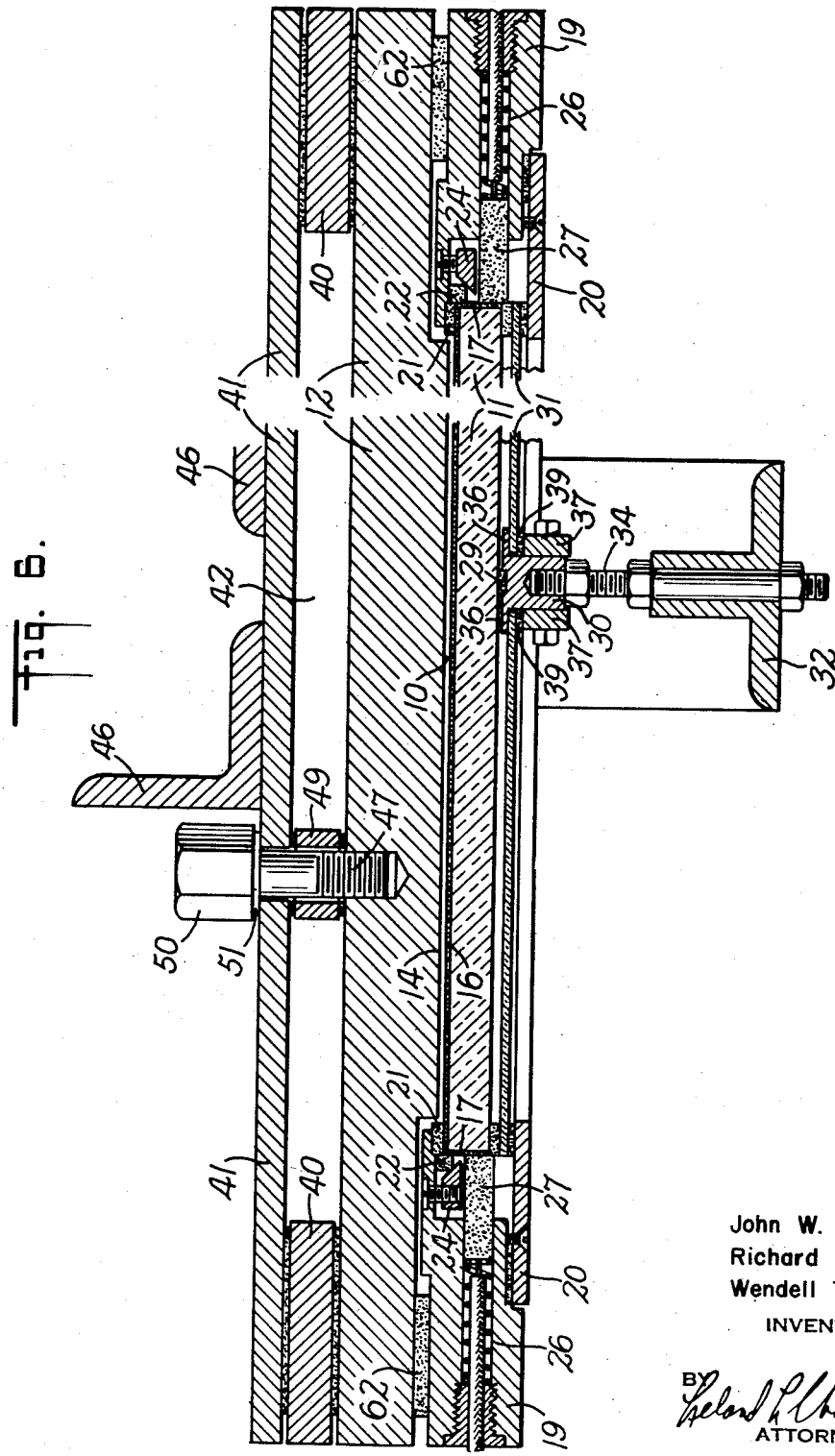

2,834,468

THERMAL DIFFUSION APPARATUS

John W. Thomas, Mayfield Heights, Richard W. Asmus, Cleveland, and Wendell T. Berg, Euclid, Ohio, assignors to The Standard Oil Company, Cleveland, Ohio, a corporation of Ohio Application May 11, 1955, Serial No. 507,596

9 Claims. (Cl. 210—176)

This invention relates to apparatus for separating, by thermal diffusion, dissimilar components of a fluid mixture and more particularly to an embodiment of such apparatus in which the progress of the separation can be observed while it is taking place.

Apparatus for separating fluid by thermal diffusion have been known for many years. Essentially they comprise means for confining a fluid in a narrow chamber and for imposing a temperature gradient across the narrow chamber. One such type of apparatus may be in the form of concentric tubes wherein the inner surface of the outer tube and the outer surface of the inner tube form an annular separation chamber across which a temperature gradient is imposed by relatively heating one of the concentric tubes and relatively cooling the other. Another type of thermal diffusion apparatus is the flat type wherein the separation chamber is formed by two substantially parallel plates, one of which is relatively heated and the other of which is relatively cooled. In all types of thermal diffusion apparatus it is desirable and, for separation of liquids necessary, that the chamber-forming walls be spaced apart substantially equidistantly throughout the chamber.

In apparatus designed for the separation of liquids the spacing between the opposed chamber-forming walls should, for economical separation, be extremely small, i. e., of the order of about 0.01 to about 0.15" and preferably in the neighborhood of about 0.03". It will readily be appreciated that with such small spacings, contractions and expansions of the chamber-forming walls as they are relatively heated and cooled attain considerable importance. Thus, for example, it has been found that a steel plate 1 9/16" thick and having a working area only 25" high and 18" wide will become deflected to an excessive amount if the temperature gradient through the wall is as little at 73° F., corresponding to a heat transfer rate of 1400 B. t. u./ft.sq./hr.

It has also been observed, when dissassembling thermal diffusion apparatus used in the separation of liquid fractions, that the chamber-forming surfaces bear indications of considerable non-uniformity of flow within the chamber during operation. In order to observe the flow conditions within the separation chamber, it would of course be necessary to employ a transparent material for at least one of the chamber-forming walls. The substitution of glass for metal in thermal diffusion apparatus has however not been considered feasible heretofore because of the relatively poor thermal conductivity of glass as well as the relatively greater tendency of glass to become over-stressed upon being subjected to a higher temperature at one surface than at the other and the greater tendency to become over-stressed under physical pressure such as that which would be exerted by a liquid under pressure in a separation chamber.

It is the purpose of the present invention to make visible the flow of material within the separation chamber under operating conditions, and further to provide an apparatus in which the initial spacing of the opposed chamber-forming wall surfaces is maintained substantially constant despite substantial departures, from room temperature, of the temperatures of the relatively heated and relatively cooled wall members when the apparatus is brought into operative condition.

In accordance with the invention, a thermal diffusion apparatus is provided in which one of the wall members is a heat-resistant, transparent material having an electrically conductive film substantially coextensive with its chamber-forming surface. The electrically conductive film is provided with electrodes adapted to be connected to a source of electrical energy for passing an electric current through the conductive film and thus heating the transparent wall members.

Means are provided for maintaining the spacing of the chamber-forming surfaces substantially constant regardless of temperature changes between room temperatures and operating temperatures of the wall members. The means employed in accordance with the invention for maintaining the chamber spacing substantially constant include a relatively rigid member in supporting contact with the back of the transparent wall member to avoid bowing out of said member, a cover plate for insulating the back of the transparent wall member from atmospheric temperature conditions so as to reduce the temperature gradient within the wall member and thereby reduce its tendency to bow into the separation chamber, and a plurality of anchor devices anchoring the other wall member to a relatively rigid rib member to avoid deflection or distortion of the other wall member into or away from the separation chamber.

In the preferred embodiment of the invention the relatively heated wall, hereinafter referred to simply as the "hot" wall, is a heat-resistant borosilicate glass that is coated with an extremely thin (of the order of about 15 to 20 millionths of an inch thick) and transparent film of electrically conductive material, such as stannic oxide, applied by any suitable means, e. g., by spraying an alcohol solution of stannic tetrachloride onto the glass heated to substantially its softening point. The electrodes preferably comprise metal coatings that are on or adjacent opposite edges of the transparent wall member and in contact with the conductive film. These coatings may readily be obtained by baking on silver, gold or platinum fluxes or a combination thereof, or by spraying copper or copper alloys, as known in the art. The electrode-coatings in turn are connected to a source of electrical energy by suitable conductors, preferably spring-biased carbon brushes.

The support for the glass plate in the preferred embodiment is a rigid rib member mounted on a frame for the glass plate and provided with a glass strip for contacting the back of the transparent wall and thus minimizing local stresses due to temperature variations. The transparent wall member is insulated from atmospheric temperature conditions by a safety glass partition spaced from the back of the transparent wall member and thus providing a dead air space.

The relatively cooled wall, hereinafter referred to simply as the "cold" wall, is preferably of a metal that is inert to the fluids subjected to thermal diffusion and that has a high heat conductivity. Behind the wall there is provided a peripheral ring member and a plate member together forming a cooling jacket. In back of the cooling jacket and in intimate contact with the cooling jacket plate, rigid re-enforcing members such as angle irons are provided and suitable anchoring devices such as stud bolts or the like are utilized to anchor the cold wall effectively to the rigid members and thus to avoid distortion thereof into or away from the separation chamber.

In the preferred embodiment the inlet and withdrawal ports are all provided in the cold wall. To this end the cold wall is machined to have three grooves, each groove having shoulder portions for carrying elongated strips with facing ground edges. The elongated strips are provided with transverse slots to accommodate hold down screws and permit slight lateral adjustment of the strips relative to the groove so that the spacing between the opposed ground edges of the strip for a particular groove can be carefully adjusted. The space between the opposed ground edges forms a passageway between the separation chamber and the bottom of the groove which communicates with the exterior of the apparatus by way of a drilled hole through the edge of the cold wall member.

One of the primary advantages of the apparatus of the invention is that the contents of the separation chamber are at all times visible to the operator so that suitable changes in methods of operation can be promptly carried out to obtain the most efficient separation of the particular fluid being subjected to thermal diffusion. Another important advantage is that interference with the success of a thermal diffusion separation due to variations in the actual spacing between the chamber-forming walls and possible blocking of the chamber by touching of the walls under various conditions of operation are eliminated or at least reduced to a minimum. An ancillary advantage is that the apparatus does not require the use of spacers within the separation chamber.

These and other advantages, as well as the utility of the apparatus, will become further apparent from the following detailed description made with reference to the accompanying drawing. This detailed description is given to illustrate the best mode presently contemplated of practicing the invention and is not intended to limit its scope.

In the drawing:

Figure 1 is an exploded perspective of an apparatus constructed in accordance with the preferred embodiment of the invention;

Figure 2 is a view in perspective of the apparatus assembled for operation;

Figure 3 is a view in vertical section taken on line 3—3 of Figure 2;

Figure 4 is a vertical section, on an enlarged scale, taken on line 4—4 of Figure 3;

Figure 5 is a vertical section, likewise on an enlarged scale, taken on line 5—5 of Figure 4; and Figure 6 is a view in horizontal section taken on line 6—6 of Figure 2.

Referring now to the drawing, a thermal diffusion chamber 10 is formed between the wall members 11 and 12 having opposed surfaces 14 and 16 spaced apart approximately 0.03″. The wall member 11 is of a heat-resistant transparent material, preferably a borosilicate glass of the type available under the name "Pyrex." The chamber-forming surface 14 of the wall member 11 is covered with a transparent film of electrically conductive material that is substantially coextensive in area with the separation chamber. In the preferred embodiment the wall member 11 is a plate of "E–C" glass available from the Corning Glass Works, believed to be a "Pyrex" glass having a transparent, conductive film, about 20 millionths inch thin, of stannic oxide permanently bonded to one side. The opposed edges 17 are provided with adjacent and contacting electrode-coatings of electrically conductive material, such as silver.

The wall member 11 is supported at the edges by a frame 19 and a retaining ring 20 secured to the frame, suitable gaskets 21 and 22 and a packing ring 24 being provided to insulate the frame 19 electrically from the conductive film and to provide a leakproof connection between the wall member 11 and the frame. The frame 19 is provided at opposite sides with a number of holes 26 containing spring-biased carbon brushes 27 in contact with the electrode-coated edges 17 of the wall member 11.

In order to reduce lateral distortion of the wall member 11, i. e., either bowing outward from the chamber due to pressure of liquid therein or bowing inward due to temperature differentials on the two surfaces of the wall member, the back of the wall member 11 is supported by contact with a glass strip 29 backed up by a relatively rigid supporting rib member 30 and insulated from the atmospheric temperature conditions by a cover plate 31 preferably of safety glass. The rib member 30 is in turn supported adjustably by a channel member 32 mounted on the retaining ring 20, a number of adjusting screws 34 being utilized to insure equal distribution of pressure along the entire length of the glass strip 29.

The rib member 30 is provided with shoulders 36 for supporting the cover plate 31 and with elongated clamp plates 37 and associated gaskets 39 for supporting the edges of the cover plate 31 that are not supported in the frame and ring assembly 19, 20.

The other wall member 12 is preferably of a metal or alloy that is inert to the liquid to be subjected to thermal diffusion under the conditions of operation and that combines good heat conductivity with a low coefficient of thermal expansion. To the rear of the plate 12 there is a peripheral ring 40 and a cover plate 41 forming a cooling jacket 42 provided with any suitable means such as passageways 44 for introducing and withdrawing a cooling medium such as water. To reduce the lateral distortion of the wall member 12 under the conditions of operation, the cover plate 41 is made relatively rigid by means of angle members 46 or the like and by threaded bolts 47, provided with spacer rings 49 and adjusting heads 50, anchored in the rear surfaces of the plate member 12, suitable gaskets being provided at 51 for avoiding leakage of cooling fluid.

In the embodiment illustrated in the drawing the plate member 12 is provided with three ports each comprising an elongated groove 52 having shoulder portions 54 for supporting elongated strip members 56 that are substantially coextensive with the groove and flush with the chamber-forming surface 16. The strip members 56 are provided with transverse slots 57 to permit limited adjustment on the shoulders 54 of the groove and with machined edges 59, preferably knife edges, to form a restricted passageway between the interior of the groove 52 and the separation chamber 10. Each of the ports is further provided with a passageway 60 leading from the interior of the groove to the exterior of the apparatus for transmitting liquid.

The entire assembly is retained in operative position by any suitable clamping means such as the peripheral bolts 61 in cooperation with gaskets 62.

In operation, cooling water is introduced into and removed from the cooling jacket 42 by way of passageways 44 to relatively cool the wall member 12 and the electrodes 17 are connected to a source of electric current in order to heat the wall member 11 due to resistance of the conductive film thereon. The tendency of the wall member 11 to bow inward relative to the chamber due to the higher temperature of the wall member at the chamber-forming surface than at the rear surface is reduced by the insulating effect of the dead air space formed by the cover plate 31. The tendency of the plate member 11 to bow outwardly relative to the separation chamber 10 is reduced by the abutment against its rear side of the glass strip member 29 backed up by the rigid rib member 30. A similar tendency on the part of the cold wall member 12 to bow into the separation chamber is reduced by the effect of the bolt members 47 anchored into the rear of the wall member 12 and supported by the cover plate 41 which in turn is made rigid by virtue of the angle members 46 affixed thereto.

With the hot and cold wall members 11 and 12 thus relatively heated and cooled and maintained substantially in their original equidistantly spaced relation, the liquid to be subjected to thermal diffusion is introduced into the chamber by way of the port intermediate the upper and lower ends of the chamber and the hot and cold products obtained are withdrawn through the upper and lower ports, respectively.

It is to be understood of course that many changes and modifications will occur to those skilled in the art upon reading this description. All such modifications and changes are intended to be included within the scope of the invention as defined in the accompanying claims.

We claim:

1. Thermal diffusion apparatus comprising first and second wall members having opposed surfaces spaced apart substantially equidistantly for forming a thermal diffusion separation chamber between them, one of said wall members being transparent and having an electrically conductive film substantially coextensive with the chamber-forming surface thereof; means for introducing and withdrawing liquid into and from said chamber; means for passing an electric current through the conductive film and thereby relatively heating the transparent wall member; means for relatively cooling the other wall member; and means for maintaining the spacing of the chamber-forming surfaces substantially constant.

2. Thermal diffusion apparatus comprising first and second wall members having opposed surfaces spaced apart substantially equidistantly for forming a thermal diffusion separation chamber between them, one of said wall members being transparent and having an electrically conductive film substantially coextensive with the chamber-forming surface thereof; means for introducing and withdrawing liquid into and from said chamber; means for passing an electric current through the conductive film and thereby relatively heating the transparent wall member; means for relatively cooling the other wall member; and means for maintaining the spacing of the chamber-forming surfaces substantially constant, said last-named means comprising a relatively rigid rib member in supporting contact with the back of the transparent wall member.

3. Thermal diffusion apparatus comprising first and second wall members having opposed surfaces spaced apart substantially equidistantly for forming a thermal diffusion separation chamber between them, one of said wall members being transparent and having an electrically conductive film substantially coextensive with the chamber-forming surface thereof; means for introducing and withdrawing liquid into and from said chamber; means for passing an electric current through the conductive film and thereby relatively heating the transparent wall member; means for relatively cooling the other wall member; and means for maintaining the spacing of the chamber-forming surfaces substantially constant, said last-named means comprising a cover plate for insulating the back of the transparent wall member from atmospheric temperature conditions.

4. Thermal diffusion apparatus comprising first and second wall members having opposed surfaces spaced apart substantially equidistantly for forming a thermal diffusion separation chamber between them, one of said wall members being transparent and having an electrically conductive film substantially coextensive with the chamber-forming surface thereof; means for introducing and withdrawing liquid into and from said chamber; means for passing an electric current through the conductive film and thereby relatively heating the transparent wall member; means for relatively cooling the other wall member; and means for maintaining the spacing of the chamber-forming surfaces substantially constant, said last-named means comprising a relatively rigid rib member in supporting contact with the back of the transparent wall member and a cover plate for insulating the back of said wall member from atmospheric temperature conditions.

5. Thermal diffusion apparatus comprising first and second wall members having opposed surfaces spaced apart substantially equidistantly for forming a thermal diffusion separation chamber between them, one of said wall members being transparent and having a first electrically conductive film substantially coextensive with the chamber-forming surface thereof; means for introducing and withdrawing liquid into and from said chamber; means for relatively heating the transparent wall member comprising electrode coatings of electrically conductive material on opposite edges of the wall member and in contact with the electrically conductive film and conductors urged into contact with said electrode-coatings and adapted to be connected in turn to a source of electrical energy for passing an electric current through the electrically conductive film; means for relatively cooling the other wall member; and means for maintaining the spacing of the chamber-forming surfaces substantially constant.

6. Thermal diffusion apparatus comprising first and second wall members having opposed surfaces spaced apart substantially equidistantly for forming a thermal diffusion separation chamber between them, one of said wall members being transparent and having an electrically conductive film substantially coextensive with the chamber-forming surface thereof; means for introducing and withdrawing liquid into and from said chamber; means for passing an electric current through the conductive film and thereby relatively heating the transparent wall member; means for relatively cooling the other wall member; and means for maintaining the spacing of the chamber-forming surfaces substantially constant, said last-named means comprising a plurality of anchor devices anchoring said other wall member to a relatively rigid rib member.

7. Thermal diffusion apparatus comprising first and second wall members having opposed surfaces spaced apart substantially equidistantly for forming a thermal diffusion separation chamber between them, one of said wall members being transparent and having an electrically conductive film substantially coextensive with the chamber-forming surface thereof; means for introducing and withdrawing liquid into and from said chamber; means for passing an electric current through the conductive film and thereby relatively heating the transparent wall member; means for relatively cooling the other wall member; and means for maintaining the spacing of the chamber-forming surfaces substantially constant, said last-named means comprising a first relatively rigid rib member in supporting contact with the back of the transparent wall member, a cover plate for insulating the back of the transparent wall member from atmospheric temperature conditions, and a plurality of anchor devices anchoring the other wall member to a second relatively rigid rib member.

8. Thermal diffusion apparatus comprising first and second wall members having opposed surfaces spaced apart substantially equidistantly for forming a thermal diffusion separation chamber between them, one of said wall members being transparent and having an electrically conductive film substantially coextensive with the chamber-forming surface thereof; means for introducing and withdrawing liquid into and from said chamber, said means comprising at least one elongated groove in the chamber-forming surface of one of the wall members, two elongated strip members in and substantially coextensive with the groove, flush with the chamber-forming surface, and adjustable laterally for forming a narrow passageway between the chamber and the interior of the groove, and a passageway from the groove to the exterior of the apparatus for transmission of liquid therethrough; means for passing an electric current through the conductive film and thereby relatively heating the transparent wall member; means for relatively cooling the other wall member; and means for maintaining the spacing of the chamber-forming surfaces substantially constant.

9. Thermal diffusion apparatus comprising first and second wall members having opposed surfaces spaced apart substantially equidistantly for forming a thermal diffusion separation chamber between them, one of said wall members being transparent and having a first electrically conductive film on and substantially coextensive with the chamber-forming surface thereof; means for introducing and withdrawing liquid into and from said chamber, said means comprising at least one elongated groove in the chamber-forming surface of one of the wall members, two elongated strip members in and substantially coextensive with the groove, flush with the chamber-forming surface, and adjustable laterally for forming a narrow passageway between the chamber and the interior of the groove, and a passageway from the groove to the exterior of the apparatus for transmission of liquid therethrough; means for relatively heating the transparent wall member comprising electrode-coatings of electrically conductive material on opposite edges of the wall member and in contact with the conductive film and conductors urged into contact with said electrode-coatings and adapted to be connected in turn to a source of electrical energy for passing an electric current through the conductive film; means for relatively cooling the other wall member; and means for maintaining the spacing of the chamber-forming surfaces substantially constant, said last-named means comprising a first relatively rigid rib member in supporting contact with the back of the transparent wall member, a cover plate for insulating the back of the transparent wall member from atmospheric temperature conditions, and a plurality of anchor devices anchoring the other wall member to a second relatively rigid rib member.

References Cited in the file of this patent

UNITED STATES PATENTS

| | | |
|---|---|---|
| 2,429,420 | McMaster | Oct. 21, 1947 |
| 2,541,071 | Jones et al. | Feb. 13, 1951 |
| 2,651,585 | Lytle et al. | Sept. 8, 1953 |
| 2,720,975 | Jones et al. | Oct. 18, 1955 |